US012766573B2

(12) United States Patent
Miyagawa

(10) Patent No.: US 12,766,573 B2
(45) Date of Patent: Oct. 20, 2026

(54) ABRASION DETECTION DEVICE, ABRASION DETECTION METHOD, SUBSTRATE CLEANING DEVICE, AND SUBSTRATE CLEANING METHOD

(71) Applicant: EBARA CORPORATION, Tokyo (JP)

(72) Inventor: Saki Miyagawa, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 204 days.

(21) Appl. No.: 18/830,568

(22) Filed: Sep. 10, 2024

(65) Prior Publication Data

US 2025/0083200 A1 Mar. 13, 2025

(30) Foreign Application Priority Data

Sep. 12, 2023 (JP) ................................. 2023-147719

(51) Int. Cl.
*B08B 13/00* (2006.01)
*B08B 1/34* (2024.01)

(52) U.S. Cl.
CPC ................ *B08B 13/00* (2013.01); *B08B 1/34* (2024.01)

(58) Field of Classification Search
CPC ................................. B08B 13/00; B08B 1/34
See application file for complete search history.

(56) References Cited

U.S. PATENT DOCUMENTS 7,435,302 B2 * 10/2008 Takahara ................. B08B 1/34
134/32
8,608,858 B2 * 12/2013 Hamada ............. H10P 72/0412
134/6
12,191,166 B2 * 1/2025 Uno .................... H10P 14/6528
2002/0004962 A1 * 1/2002 Oikawa ..................... B08B 1/14
15/4
2002/0074016 A1 * 6/2002 Crevasse ................... B08B 1/34
134/2
2003/0111095 A1 * 6/2003 Sugarman ................. B08B 1/34
15/21.1
2007/0017088 A1 * 1/2007 Ishitani ..................... B08B 1/34
29/740
2008/0289652 A1 * 11/2008 Hamada .............. H10P 72/0412
134/6
2008/0305715 A1 * 12/2008 Ito ......................... B24B 53/017
451/6
2015/0338328 A1 * 11/2015 Hombo ................... B08B 1/143
15/102
2018/0289230 A1 * 10/2018 Imamura ................. A47L 11/18
2020/0147654 A1 * 5/2020 Tanaka ....................... B08B 1/14
2022/0258217 A1 * 8/2022 Nishijima ................. B08B 1/12
2022/0395874 A1 * 12/2022 Takahashi ................. B08B 1/14
(Continued)

FOREIGN PATENT DOCUMENTS

JP 2019087762 6/2019
JP 2022124016 8/2022
WO WO-2006035624 A1 * 4/2006 .......... H10P 72/0416

*Primary Examiner* — Alexander Markoff
(74) *Attorney, Agent, or Firm* — JCIPRNET

(57) ABSTRACT

An abrasion detection device is provided, including: one or more sensors, outputting a measurement value in accordance with abrasion of a substrate cleaning tool; a pressing mechanism, pressing the substrate cleaning tool against the sensor; and a determination part, performing a determination on whether it is necessary to replace the substrate cleaning tool in accordance with the measurement value from the sensor.

19 Claims, 10 Drawing Sheets

(56) References Cited

U.S. PATENT DOCUMENTS

| | | | | |
|---|---|---|---|---|
| 2022/0410343 | A1 * | 12/2022 | Ishibashi | B08B 1/12 |
| 2025/0173611 | A1 * | 5/2025 | Takebuchi | B24B 37/013 |
| 2025/0217670 | A1 * | 7/2025 | Takebuchi | G06N 5/022 |

* cited by examiner

ABRASION DETECTION DEVICE, ABRASION DETECTION METHOD, SUBSTRATE CLEANING DEVICE, AND SUBSTRATE CLEANING METHOD

CROSS-REFERENCE TO RELATED APPLICATION

This application claims the priority benefit of Japan application serial no. 2023-147719, filed on Sep. 12, 2023. The entirety of the above-mentioned patent application is hereby incorporated by reference herein and made a part of this specification.

BACKGROUND

Technical Field

The invention relates to an abrasion detection device, an abrasion detection method, a substrate cleaning device, and a substrate cleaning method.

Description of Related Art

Various substrate cleaning devices are known (Patent Documents 1, 2). A substrate cleaning tool used in such substrate cleaning device performs substrate cleaning by coming into contact with a substrate. Therefore, the substrate cleaning tool performing cleaning may be abraded. When the abrasion becomes severe, it is difficult to appropriately clean the substrate.

PRIOR ART DOCUMENT(S)

Patent Document(s)

[Patent Document 1] Japanese Laid-open No. 2022-124016
[Patent Document 2] Japanese Laid-open No. 2019-87762

SUMMARY

An abrasion detection device includes: one or more sensors, outputting a measurement value in accordance with an abrasion of a substrate cleaning tool; a pressing mechanism, pressing the substrate cleaning tool against the sensor; and a determination part, performing a determination on whether it is necessary to replace the substrate cleaning tool in accordance with the measurement value from the sensor.

An abrasion detection device includes: one or more sensors, outputting a measurement value in accordance with an abrasion of a substrate cleaning tool; a pressing mechanism, pressing the substrate cleaning tool against the sensor; and a determination part, performing a determination on whether it is necessary to change a cleaning parameter at a time of performing substrate cleaning by using the substrate cleaning tool in accordance with the measurement value from the sensor.

An abrasion detection device includes: multiple sensors, outputting measurement values in accordance with an abrasion of a substrate cleaning tool; a pressing mechanism, pressing the substrate cleaning tool against the sensors; and a determination part, performing a determination on whether it is necessary to replace the substrate cleaning tool and performing a determination on whether it is necessary to change a cleaning parameter at a time of performing substrate cleaning by using the substrate cleaning tool in accordance with the measurement values from the sensors.

An abrasion detection method includes: a first process of pressing a substrate cleaning tool against at least one sensor that output a measurement value in accordance with abrasion of the substrate cleaning tool; and a second process of determining whether it is necessary to replace the substrate cleaning tool in accordance with the measurement value from the sensor.

An abrasion detection method includes: a first process of pressing a substrate cleaning tool against at least one sensor that output a measurement value in accordance with abrasion of the substrate cleaning tool; and a second process of performing a determination on whether it is necessary to change a cleaning parameter at a time of performing substrate cleaning by using the substrate cleaning tool in accordance with the measurement value from the sensor.

An abrasion detection method includes: a first process of pressing a substrate cleaning tool against multiple sensors that output measurement values in accordance with abrasion of the substrate cleaning tool; and a second process of performing a determination on whether it is necessary to replace the substrate cleaning tool and a determination on whether it is necessary to change a cleaning parameter at a time of performing substrate cleaning by using the substrate cleaning tool in accordance with the measurement values from the sensors.

A substrate cleaning method includes: a first process of learning a relationship between a measurement value at a time when a substrate cleaning tool is pressed against at least one sensor outputting the measurement value in accordance with abrasion of a substrate cleaning tool and an appropriate value of a cleaning parameter at a time of performing substrate cleaning by using the substrate cleaning tool; and a second process of pressing the substrate cleaning tool against the at least one sensor; a third process of changing the cleaning parameter in accordance with the measurement value from the sensor in the second process based on a learning result in the first process; and a fourth process of performing substrate cleaning based on the cleaning parameter that is changed.

DESCRIPTION OF THE EMBODIMENTS

Figure 1:
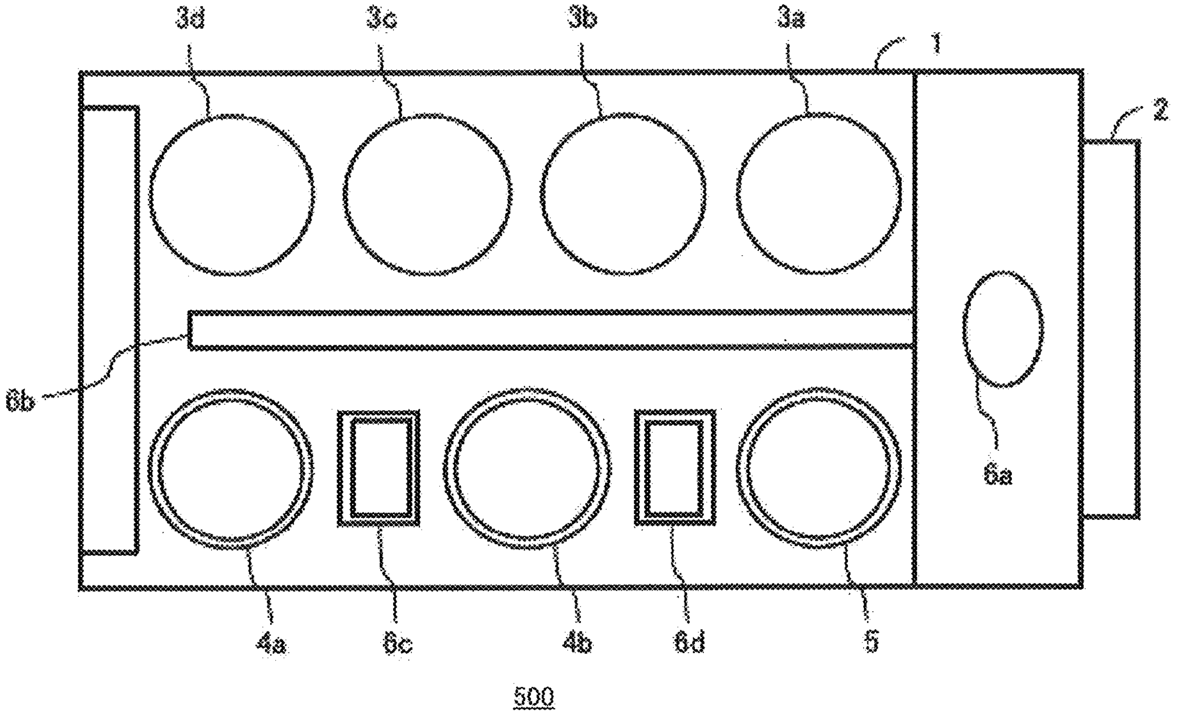
FIG. 1 is a schematic configuration diagram illustrating a substrate processing device 500.

An objective of the invention is to detect the abrasion of a substrate cleaning tool or to perform substrate cleaning in accordance with the abrasion of the substrate cleaning tool.

Solutions as follows are provided for an exemplary purpose.

[1] An abrasion detection device includes: one or more sensors, outputting a measurement value in accordance with an abrasion of a substrate cleaning tool; a pressing mechanism, pressing the substrate cleaning tool against the sensor; and a determination part, performing a determination on whether it is necessary to replace the substrate cleaning tool in accordance with the measurement value from the sensor.

[2]

An abrasion detection device includes: one or more sensors, outputting a measurement value in accordance with an abrasion of a substrate cleaning tool; a pressing mechanism, pressing the substrate cleaning tool against the sensor; and a determination part, performing a determination on whether it is necessary to change a cleaning parameter at a time of performing substrate cleaning by using the substrate cleaning tool in accordance with the measurement value from the sensor.

[3] In the abrasion detection device as claimed in [1] or [2], the at least one sensor includes multiple sensors, and the determination part performs the determination in accordance with whether the measurement values from the sensors satisfy a predetermined condition.

[4] In the abrasion detection device according to [3], the substrate cleaning tool has a cleaning surface coming into contact with a substrate at a time of substrate cleaning, and the sensors include: a first sensor, pressed at a first position different from a center of the cleaning surface; a second sensor, pressed at a second position different from the center of the cleaning surface and the first position, and a third sensor, pressed at a substantial center of the cleaning surface.

[5] In the abrasion detection device according to any one of [1] to [4], the determination part performs the determination based on a comparison between the measurement value from the sensor and a predetermined threshold.

[6] In the abrasion detection device according to [5], the threshold is a value in accordance with the measurement value from the sensor at a time when the substrate cleaning tool is pressed against the sensor before the substrate cleaning tool is used for substrate cleaning.

[7] An abrasion detection device includes: multiple sensors, outputting measurement values in accordance with an abrasion of a substrate cleaning tool; a pressing mechanism, pressing the substrate cleaning tool against the sensors; and a determination part, performing a determination on whether it is necessary to replace the substrate cleaning tool and performing a determination on whether it is necessary to change a cleaning parameter at a time of performing substrate cleaning by using the substrate cleaning tool in accordance with the measurement values from the sensors.

[8] In the abrasion detection device according to [7], the determination part performs a determination that it is not necessary to replace the substrate cleaning tool and no change is to be made to the cleaning parameter in a case where the measurement values from the sensors satisfy a first condition, performs a determination that it is not necessary to replace the substrate cleaning tool but it is necessary to change the cleaning parameter in a case where the measurement values from the sensors satisfy a second condition, and performs a determination that it is necessary to replace the substrate cleaning tool in a case where the measurement values from the sensors satisfy a third condition.

[9] In the abrasion detection device according to [8], the first condition is that the measurement values from the sensors all exceed a threshold, the second condition is that the measurement values from the sensors are all lower than the threshold, and the third condition is that only some of the measurement values from the sensors are lower than the threshold.

[10] In the abrasion detection device according to any one of [7] to [9], the determination part changes the cleaning parameter in accordance with the measurement values in a case where it is determined as necessary to change the cleaning parameter.

[11] In the abrasion detection device according to [10], the determination part learns in advance a relationship between the measurement values and an appropriate value of the cleaning parameter and changes the cleaning parameter based on a learning result.

[12] In the abrasion detection device according to or [11], substrate cleaning includes pressing the substrate cleaning tool against a substrate by a predetermined stroke amount, and the cleaning parameter is the stroke amount, and the determination part changes the stroke amount so that a pressing force of the substrate cleaning tool with respect to the substrate becomes a target value.

[13] In the abrasion detection device according to any one of [7] to [12], the substrate cleaning tool has a cleaning surface coming into contact with a substrate at a time of substrate cleaning, and the sensors include: a first sensor, pressed at a first position different from a center of the cleaning surface; a second sensor, pressed at a second position different from the center of the cleaning surface and the first position, and a third sensor, pressed at a substantial center of the cleaning surface.

[14] In the abrasion detection device according to any one of [2] and [7] to [13], substrate cleaning includes pressing the substrate cleaning tool against a substrate by a predetermined stroke amount, and the cleaning parameter is the stroke amount.

[15] In the abrasion detection device according to any one of [1] to [14], the sensor is a pressure sensor or a strain sensor.

[16] A substrate cleaning device includes: a substrate cleaning tool; a self-cleaning device, performing self-cleaning of the substrate cleaning tool; and the abrasion detection device according to any one of [1] to [14]. The sensor of the abrasion detection device is provided at the self-cleaning device or in a vicinity of the self-cleaning device.

[17] In the substrate cleaning device according to [16], the sensor is a pressure sensor, the self-cleaning device has a cleaning plate on which a pressure distribution sensor is mounted, the pressure distribution sensor being provided with the multiple pressure sensors, and with the pressing mechanism of the abrasion detection device pressing the substrate cleaning tool against the cleaning plate, the substrate cleaning tool is self-cleaned and measurements are carried out by the pressure sensors.

[18] A substrate cleaning device includes: a substrate cleaning tool; and the abrasion detection device according to any one of [1] to [15]. The pressing mechanism of the abrasion detection device presses the substrate cleaning tool against a substrate for substrate cleaning, and presses the substrate cleaning tool against the sensor for the determination by the determination part.

[19] A substrate cleaning device includes: a substrate cleaning tool; the abrasion detection device according to any one of to [12]; and a control part, exerting control to press the substrate cleaning tool against a substrate in accordance with a cleaning parameter changed by the determination part of the abrasion detection device at a time of substrate cleaning.

[20] A substrate processing device includes: a substrate polishing device, polishing a substrate; and the substrate cleaning device according to any one of to [19], cleaning the substrate after the substrate is polished.

[21] An abrasion detection method includes: a first process of pressing a substrate cleaning tool against at least one sensor that output a measurement value in accordance with abrasion of the substrate cleaning tool; and a second process of determining whether it is necessary to replace the substrate cleaning tool in accordance with the measurement value from the sensor.

[22] An abrasion detection method includes: a first process of pressing a substrate cleaning tool against at least one sensor that output a measurement value in accordance with abrasion of the substrate cleaning tool; and a second process of performing a determination on whether it is necessary to change a cleaning parameter at a time of performing substrate cleaning by using the substrate cleaning tool in accordance with the measurement value from the sensor.

[23] An abrasion detection method includes: a first process of pressing a substrate cleaning tool against multiple sensors that output measurement values in accordance with abrasion of the substrate cleaning tool; and a second process of performing a determination on whether it is necessary to replace the substrate cleaning tool and a determination on whether it is necessary to change a cleaning parameter at a time of performing substrate cleaning by using the substrate cleaning tool in accordance with the measurement values from the sensors.

[24] The abrasion detection method according to or further includes a third process of changing the cleaning parameter in accordance with the measurement values in a case where it is determined as necessary to change the cleaning parameter.

[25] A substrate cleaning method includes: a process of executing the abrasion detection method according to [21] to [23]; a process of performing substrate cleaning without replacing the substrate cleaning tool in a case where it is determined as not necessary to replace the substrate cleaning tool in the second process; and a process of replacing the substrate cleaning tool and performing substrate cleaning by using a new substrate cleaning tool in a case where it is determined as necessary to replace the substrate cleaning tool.

[26] A substrate cleaning method includes: a process of executing the abrasion detection method according to [24]; and a process of pressing the substrate cleaning tool against a substrate to perform substrate cleaning in accordance with a cleaning parameter changed in accordance with the third process.

[27] A substrate cleaning method includes: a first process of learning a relationship between a measurement value at a time when a substrate cleaning tool is pressed against at least one sensor outputting the measurement value in accordance with abrasion of a substrate cleaning tool and an appropriate value of a cleaning parameter at a time of performing substrate cleaning by using the substrate cleaning tool; and a second process of pressing the substrate cleaning tool against the at least one sensor; a third process of changing the cleaning parameter in accordance with the measurement value from the sensor in the second process based on a learning result in the first process; and a fourth process of performing substrate cleaning based on the cleaning parameter that is changed.

It is possible to detect the abrasion of the substrate cleaning tool or perform substrate cleaning in accordance with the abrasion of the substrate cleaning tool.

In the following, the embodiments of the invention are described in detail with reference to the drawings.

FIG. 1 is a schematic configuration diagram illustrating a substrate processing device 500. The substrate processing device 500 is a CMP device, for example, and includes a housing 1 in a substantially rectangular shape and a loading port 2 disposed in adjacency with the housing 1.

A substrate cassette (not shown) in which multiple substrates W are stocked is placed on the load port 2. As the substrate W, examples may include a semiconductor wafer, etc. However, the substrate W as the processing target is not limited to the semiconductor wafer, and may also be other types of substrates used for manufacturing semiconductor devices, such as ceramic substrates. In addition, a semiconductor film, a metal film, etc., is formed on at least one surface of the substrate W.

The substrate processing device 500 includes one or more (four in FIG. 1) substrate polishing devices 3*a* to 3*d* (generally referred to as "substrate polishing device 3" in the case where these devices are not specifically distinguished), one or more (two in FIG. 1) substrate cleaning devices 4*a*, 4*b* (generally referred to as "substrate cleaning device 4" in the case where these devices are not specifically distinguished), and one or more (one in FIG. 1) substrate drying devices 5, and these components are disposed inside the housing 1.

As an example, the substrate polishing devices 3*a* to 3*d* are disposed along a side of the housing 1 in the longitudinal direction. In addition, the substrate cleaning devices 4*a*, 4*b* and the substrate drying device 5 are disposed on the other side of the housing 1 in the longitudinal direction.

The substrate polishing device 3 polishes the surface of the substrate W. More specifically, the substrate polishing device 3 rotates the substrate W while supplying slurry onto the substrate W, and polishes the surface of the substrate W by pressing a polishing member (not shown) against the surface of the substrate W. Polishing debris and slurry may remain on the substrate W after the substrate W is polished.

The substrate cleaning device 4 cleans the surface of the substrate W that is polished. More specifically, the substrate cleaning device 4 cleans the surface of the substrate W by pressing a substrate cleaning tool (not shown in FIG. 1) against the surface of the substrate W while rotating the substrate W. The substrate cleaning tool may be contaminated by the debris and slurry remaining on the polished substrate W. In addition, in the case where a chemical solution is supplied onto the substrate W at the time of cleaning, the substrate cleaning tool may be contaminated by the substrate cleaning tool.

Therefore, a device that cleans the substrate cleaning tool (referred to as a "self-cleaning device", and cleaning of the substrate cleaning tool may be referred to as "self-cleaning") is provided in the substrate cleaning device 4. The configuration example of the substrate cleaning device 4 will be described afterwards.

In addition, with the substrate cleaning tool being used to perform substrate cleaning, the substrate cleaning tool is abraded. When the abrasion becomes severe, it is difficult to properly clean the substrate. Therefore, in the embodiment, an abrasion detection device is provided. Details in this respect are described in the following.

The substrate drying device 5 dries the surface of the cleaned substrate W. For example, the substrate drying device 5 is a spin drying device, and dries the substrate W by using a centrifugal force through rotation of the substrate W at a high speed, while drying the substrate W by spraying isopropyl alcohol vapor from a spray nozzle onto the substrate W that rotates.

In addition, the substrate processing device 500 includes substrate transport devices 6*a* to 6*d* (generally referred to as "substrate transport device 6" in the case where these devices are not specifically distinguished, and these components are disposed inside the housing 1.

The substrate transport device 6*a* is disposed in adjacency with the load port 2. The substrate transport device 6*a* receives the unprocessed substrate W from the load port 2 and delivers to the substrate transport device 6*b*, and receives the processed substrate W from the substrate transport device 6*b*.

The substrate transport device 6*b* extends in the longitudinal direction in the central part of the housing 1. The substrate transport device 6*b* receives the unprocessed substrate W from the substrate transport device 6*a* and delivers to one of the substrate polishing devices 3*a* to 3*d*, receives the polished substrate W from the substrate polishing devices 3*a* to 3*d* and delivers to the substrate transport device 6*c*, or receives the dried substrate W from the substrate transport device 6*d* and delivers to the substrate transport device 6*a*.

The substrate transport device 6*c* is disposed between the substrate cleaning devices 4*a*, 4*b*. The substrate transport device 6*c* receives the polished substrate W from the substrate transport device 6*b* and delivers to one of the substrate cleaning devices 4*a*, 4*b*, or receives the cleaned substrate W from the substrate cleaning device 4*a* and delivers to the substrate cleaning device 4*b*.

The substrate transport device 6*d* is disposed between the substrate cleaning device 4*b* and the substrate drying device 5. The substrate transport device 6*b* receives the cleaned substrate W from the substrate cleaning device 4*b* and delivers to the substrate W to the substrate drying device 5, or receives the dried substrate W from the substrate drying device 5 and delivers to the substrate transport device 6*b*.

It is noted that the arrangement of the substrate cleaning device 3, the substrate cleaning device 4, the substrate drying device 5 and the substrate transport device 6 is merely an example. The one or more substrate transport devices 6 are provided so as to be able to transport the substrate W in the order of the substrate polishing device 3, the substrate cleaning device 4, and the substrate drying device 5.

Figure 2:
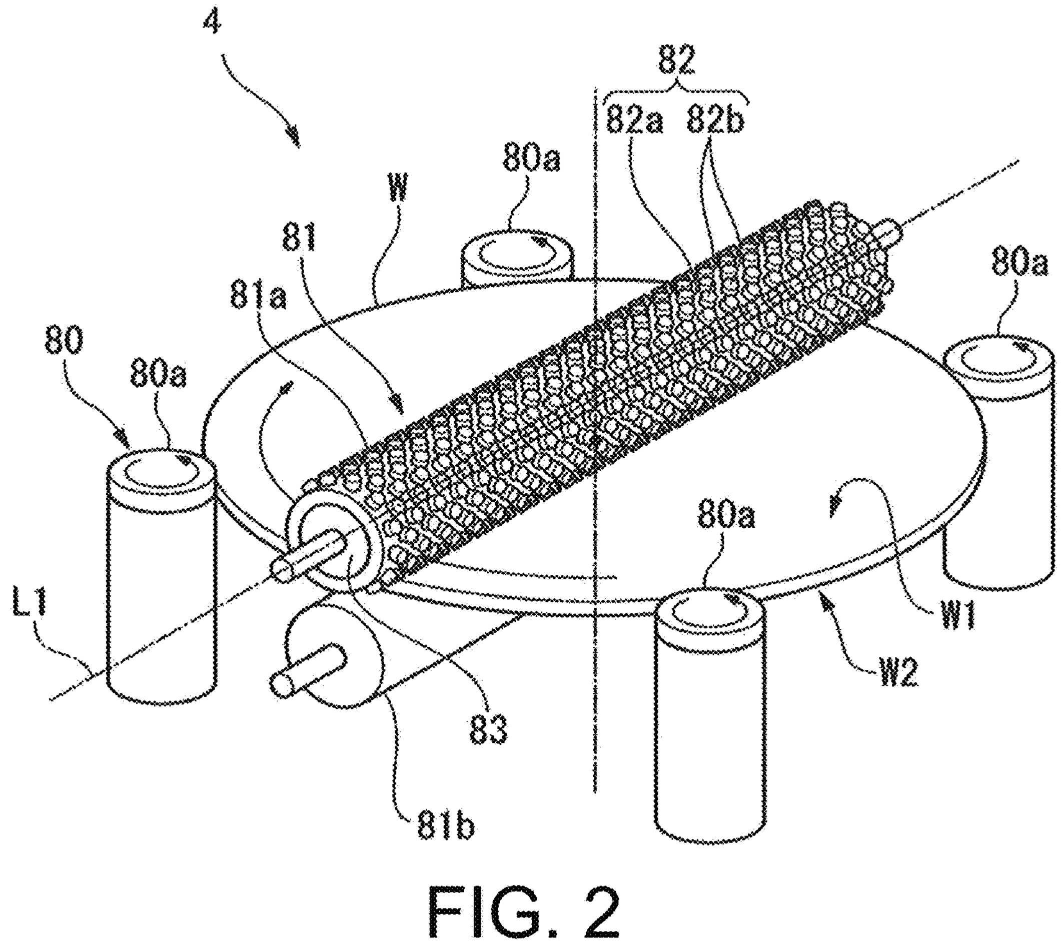
FIG. 2 is a schematic perspective view illustrating an example of a substrate cleaning device 4.

FIG. 2 is a schematic perspective view illustrating an example of the substrate cleaning device 4. The substrate cleaning device 4 includes a rotation mechanism 80 and a roll cleaning member 81 as an example of a substrate cleaning tool.

The rotation mechanism 80 rotates the substrate W in a horizontal plane. More specifically, the rotation mechanism 80 has multiple holding rollers 80*a*, and holds the outer periphery of the substrate W to rotate the substrate W about an axis extending in the vertical direction. The holding rollers 80*a* are connected with an electric driving part (not shown), such as a motor, to rotate horizontally. In addition, the holding rollers 80*a* are configured to be movable in the upper-lower direction by using an air driving part, such as an air cylinder. The rotation mechanism 80 may also hold the substrate W in the vertical direction to rotate the substrate W.

The roll cleaning member 81 has a roll cleaning member 81*a* and a roll cleaning member 81*b*. The roll cleaning member 81*a* contacts an upper surface W1 (polished surface) of the substrate W, and the roll cleaning member 81*b* contacts a lower surface W2 of the substrate W. The roll cleaning members 81*a*, 81*b* are connected with an electric driving part (not shown), such as a motor, to rotate. In addition, the roll cleaning member 81*a* of the upper part is configured to be movable in the upper-lower direction by using an air driving part (a lift device 70 to be described afterwards), such as an air cylinder. In addition, the roll cleaning member 81*b* of the lower part may be configured to be also movable in the upper-lower direction, and may also be held at a constant height.

At the time of setting the substrate W, firstly, the roll cleaning member 81*a* of the upper part and the holding rollers 80*a* are lifted. Next, the substrate W is held at a horizontal posture by the lifted holding rollers 80*a*, and then the lower surface W2 of the substrate W is lowered until coming into contact with the roll cleaning member 81*b* of the lower part. Then, the upper roll cleaning member 81*a* is lowered to come into contact with the upper surface W1 of the substrate W.

The roll cleaning member 81 has a cylindrical roll sponge 82 extending in the horizontal direction and a roll shaft 83 supporting the roll sponge 82 from the inner side. Multiple protrusion parts 82*b* in cylindrically columnar shapes are formed on a peripheral surface 82*a* of the roll sponge 82. The protrusion parts 82*b* are formed into rows along a rotation axis L1 along which the roll shaft 82 extends. As materials of the roll sponge 82, porous PVA sponge, urethane foam, etc., can be used.

It may be that the roll cleaning member 81 is manufactured and distributed with only the roll sponge 82, and is inserted with the roll shaft 83 using, or it may also be that the roll cleaning member 81 is integrally formed with the roll shaft 83 and distributed. The roll sponge 82 may be distributed either in a dry state or a wet state.

The substrate cleaning device 4 ejects the chemical solution and/or pure water (outer rinse) from a nozzle not shown herein toward the upper surface W1 of the substrate W, and brings the peripheral surfaces of the roll cleaning members 81*a*, 81*b* into contact with the substrate W to rotate the roll cleaning members 81*a*, 81*b*, thereby cleaning the substrate W. As the chemical solution, SC1 (a mixed solution of ammonia/hydrogen peroxide), etc., can be used. At the time of cleaning the substrate, the roll cleaning members 81*a*, 81*b* contact the substrate W. Therefore, due to substrate cleaning, the roll cleaning members 81*a*, 81*b* are abraded.

Figure 3:
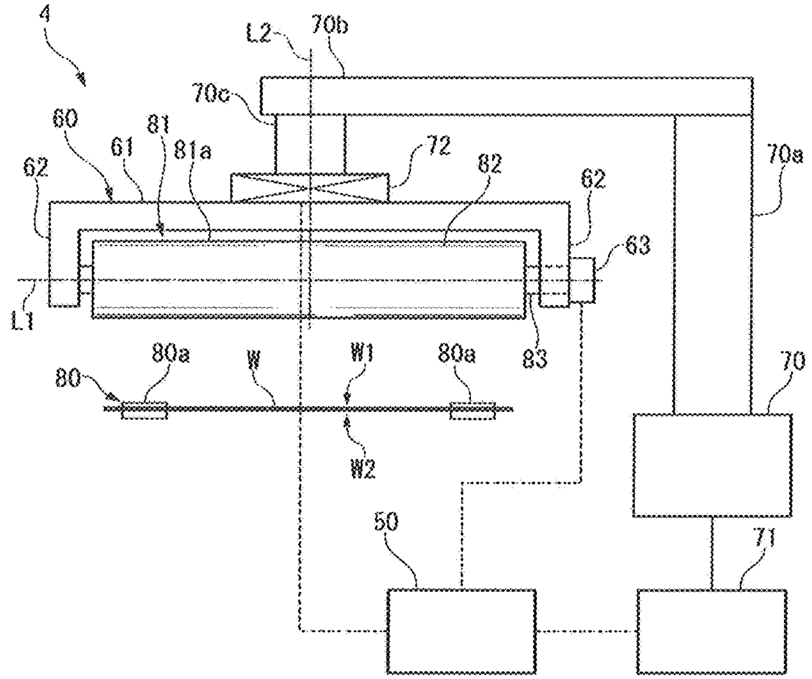
FIG. 3 is a front view illustrating a support structure of a roll cleaning member 81*a*.
Figure 4:
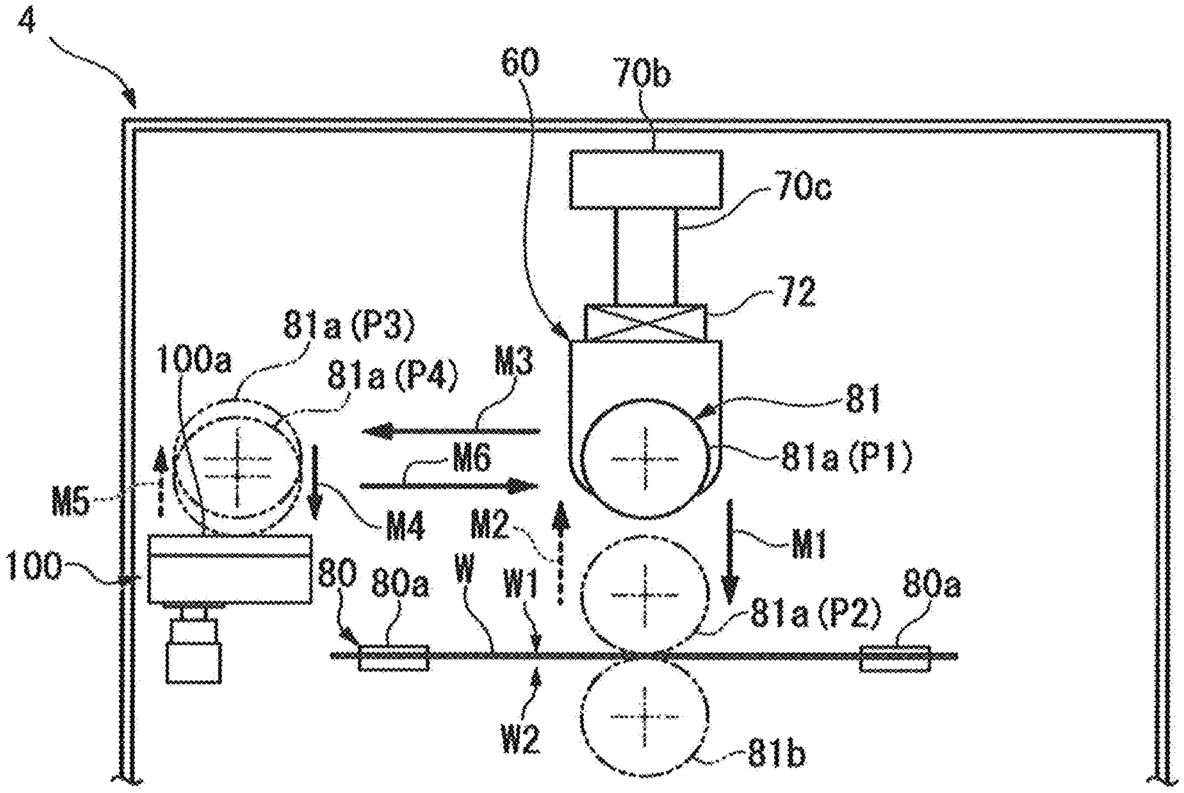
FIG. 4 is a side view illustrating movements of a roll cleaning member 81.

FIG. 3 is a front view illustrating a support structure of the roll cleaning member 81*a*. FIG. 4 is a side view illustrating movements of the roll cleaning member 81.

The substrate cleaning device 4 has a control device 50, a holder 60, the lift device 70, a horizontal movement device 71, and a self-cleaning device 100 (FIG. 4). The holder 60 supports two end parts of the roll cleaning member 81 to be rotatable about a rotation axis L1. The lift device 70 lifts and lowers the holder 60. The horizontal movement device 71 horizontally moves the holder 60.

The lift device 70 has a lift device body 70*a* and a lift arm 70*b*. The lift device body 70*a* is lifted and lowered by an air driving part (not shown), such as an air cylinder. The lift arm 70*b* is supported by the lift device body 70*a*. The lift arm 70*b* extends in the horizontal direction from the upper end part of the lift device body 70*a*, and supports the holder 60 at a tip end part extending in the horizontal direction. The lift device 70 lifts and lowers the holder 60 and the roll cleaning member 81 by lifting and lowering the lift arm 70*b* through the lift device body 70*a*. In addition to the air cylinder, a motor-driven cylinder, such as ball screw, a belt, nut-turning type, and a linear motor may also be used.

The holder 60 is suspended from a tip end part 70*c* of the lift arm 70*b*. The holder 60 has a holder body 61 and a pair of roll support parts 62. The holder body 61 extends in the horizontal direction. The pair of roll support parts 62 protrude downward from the two end parts of the holder body 61 in the extending direction. A bearing not shown herein is accommodated in the pair of roll support parts 62, and supports the two end parts of the roll cleaning member 81 to be rotatable about the rotation axis L1. The holder 60 is connected with a single axial end part of the roll cleaning member 81, and a rotation device 63, which is an electric driving part such as a motor that rotationally drives the roll cleaning member 81, is attached to the holder 60.

As shown in FIG. 4, the horizontal movement device 71 moves the roll cleaning member 81 horizontally from immediately above the substrate W to immediately above the self-cleaning device 100. The horizontal movement device 71 is formed by a conventional linear slider, etc.

The self-cleaning device 100 has a cleaning plate 100*a* against which the roll cleaning member 81 is pressed. The cleaning plate 100*a* is formed in a planar shape by using quartz, etc., for example. The material and the shape of the cleaning plate 100*a* may be changed as appropriate to match the material and the shape, etc., of the roll cleaning member 81. For example, polyvinyl chloride (PVC) may also be adopted as the forming material of the cleaning plate 100*a*.

The cleaning of the roll cleaning member 81 in the self-cleaning device 100 is performed by lowering the lift device 70 to press the roll cleaning member 81 against the cleaning plate 100*a*. In accordance with needs, at the time of pressing the roll cleaning member 81 against the cleaning plate 100*a*, the roll cleaning member 81*a* may be rotated, and the chemical solution may be ejected toward the roll cleaning member 81.

The lift device 70 and the horizontal movement device 71 move the roll cleaning member 81 to a cleaning position P1 immediately above the substrate W, a touch down position P2 toward the substrate W, a standby position P3 immediately above the self-cleaning device 100, and a touch down position P4 toward the self-cleaning device 100, as shown in FIG. 4. The movement of the roll cleaning member 81 between the cleaning position P1 and the touch down position P2 can be achieved through a lowering operation M1 and a lifting/lowering operation M2 performed by the lift device 70. The movement between the cleaning position P1 and the standby position P3 of the roll cleaning member 81 can be achieved through horizontal operations M3, M6 performed by the horizontal movement device 71. In addition, the movement of the roll cleaning member 81 between the standby position P3 and the touch down position P4 can be achieved through a lowering operation M4 and a lifting/lowering operation M5 performed by the lift device 70.

The operations of the lift device 71 and the horizontal movement device 71 are controlled by the control device 50. The control device 50 is a computer comprehensively controlling the operation of the substrate cleaning device 4. As shown in FIG. 3, the control device 5 is connected with a sensor 72 installed to the holder 60. The sensor 72 of the embodiment is a load cell that measures the pressing load of the roll sponge 82 and performs feedback control so as to achieve a target pressing force (pressing load, such as 1N). The load cell is disposed on a line L2 orthogonal to the rotation axis L1 of the roll cleaning member 81 and measures the load of the holder 60 in the tip end part 70*c* of the lift arm 70*b*. If the sensor 72 measures the information relating to the vibration at the time when the roll cleaning member 81 rotates, the sensor 72 is not limited to being a load cell, and may also be an accelerator sensor, a light sensor that optically detects the rotation shake of the roll cleaning member 81, or a camera.

The lift device body 70*a* in the embodiment presses, with a predetermined stroke amount, the roll cleaning member 81 supported by the holder 60 against the substrate W. The pressing force of the roll cleaning member 81 with respect to the substrate corresponds to the stroke amount. As an example, the greater the stroke amount of the air cylinder lifting and lowering the lift device body 70*a*, the greater the pressing force. In addition, the pressing force is detected by the sensor 72, such as a load cell, and transmitted to the control device 50.

As a property of the embodiment, the abrasion detection device that detects the abrasion of the roll cleaning member 81 is provided at the substrate cleaning device 4. The abrasion detection device may be included in the substrate cleaning device 4, and may also be a separate device from the substrate cleaning device 4. In the following, the abrasion detection device is described in detail.

Figure 5:
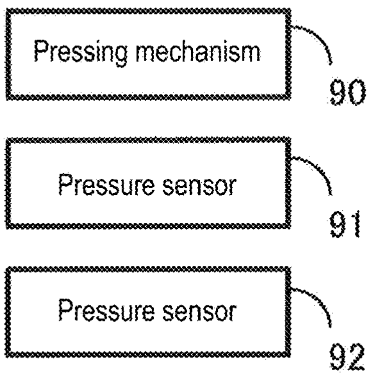
FIG. 5 is a block diagram illustrating a schematic configuration of an abrasion detection device.

FIG. 5 is a block diagram illustrating a schematic configuration of the abrasion detection device. The abrasion detection device has a pressing mechanism 90, one or more pressure sensors 91, and a determination part 92.

The pressing mechanism 90 presses the roll cleaning member 81 against the pressure sensor 91. The pressing mechanism 90 may also be the lift device 70 shown in FIGS. 3 and 4. According to such configuration, the lift device 70 as the pressing mechanism 90 presses the roll cleaning member 81 against the substrate W at the time of cleaning the substrate W, and presses the roll cleaning member 81 against the pressure sensor 91 at the time of detecting the abrasion.

With the roll cleaning member 81 being pressed, the pressure sensor 91 outputs a pressure in accordance with the abrasion of the roll cleaning member 81. The pressure sensor 91 is wiredly or wirelessly connected with the determination part 92, and the output measurement value (pressure) is transmitted to the determination part 92. Even if the pressing force from the pressing mechanism 90 is constant, the greater the abrasion amount of the roll cleaning member 81, the smaller the output pressure.

As a specific configuration example, a pressure distribution sensor 910 in which the pressure sensors 91 are provided may be used.

Figure 6A:
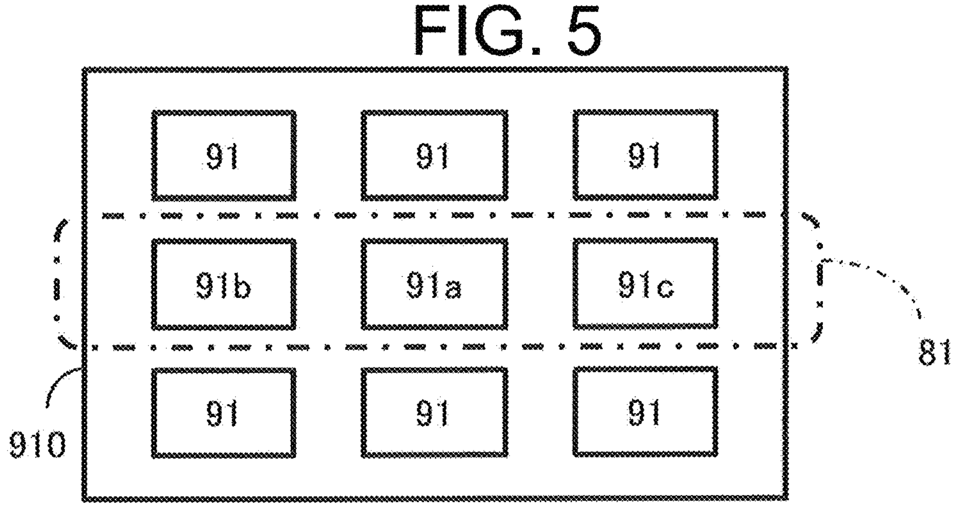
FIG. 6A is a schematic diagram illustrating an arrangement example of pressure sensors 91 in a pressure distribution sensor 910.

FIG. 6A is a schematic diagram illustrating an arrangement example of the pressure sensors 91 in the pressure distribution sensor 910. The pressure distribution sensor 910 of the same figure is rectangular. In addition, the pressure distribution sensor 910 may have a pressure sensor 91*a* and two pressure sensors 91*b*, 91*c*. The pressure sensor 91*a* is pressed at the substantial center of the cleaning surface (the surface in contact with the substrate W at the time of cleaning) of the roll cleaning member 81. The pressure sensors 91*b*, 91*c* are respectively pressed at at least two positions different from the center.

Figure 6B:
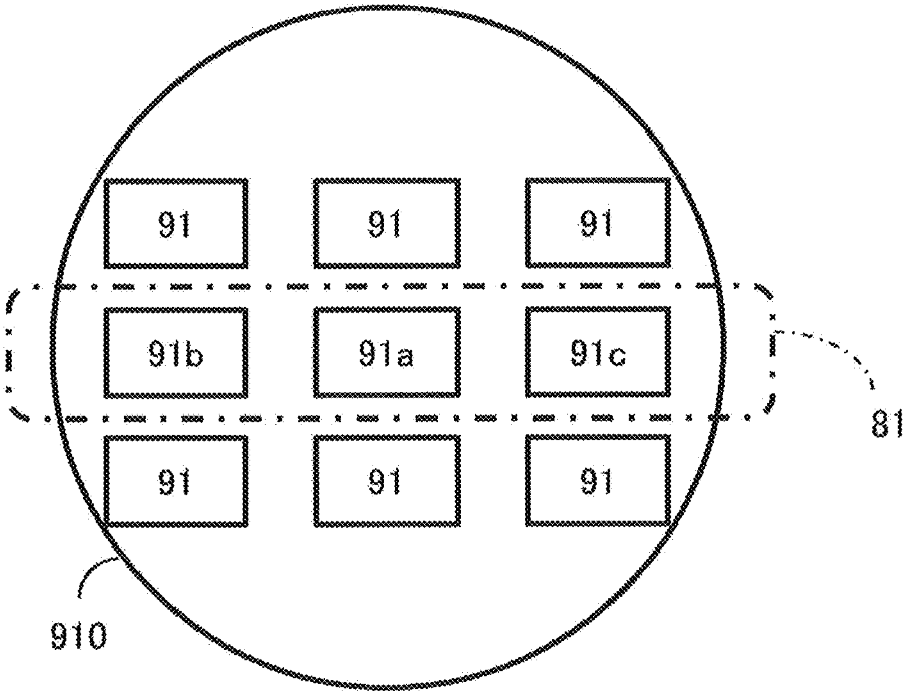
FIG. 6B is a schematic diagram illustrating another arrangement example of the pressure sensors 91 in the pressure distribution sensor 910.

FIG. 6B is a schematic diagram illustrating another arrangement example of the pressure sensors 91 in the pressure distribution sensor 910. The pressure distribution sensor 910 of the same figure is circular. In addition, the pressure distribution sensor 910 may have a pressure sensor 91*a* and two pressure sensors 91*b*, 91*c*. The pressure sensor 91*a* is pressed at the substantial center of the roll cleaning member 81. The pressure sensors 91*b*, 91*c* are respectively pressed at at least two positions different from the center.

Although the pressure sensor 91 may be located anywhere, the pressure sensor 91 may be located at or in the vicinity of the self-cleaning device 100. Accordingly, the time for moving the roll cleaning member 81 can be shortened.

Figure 7:
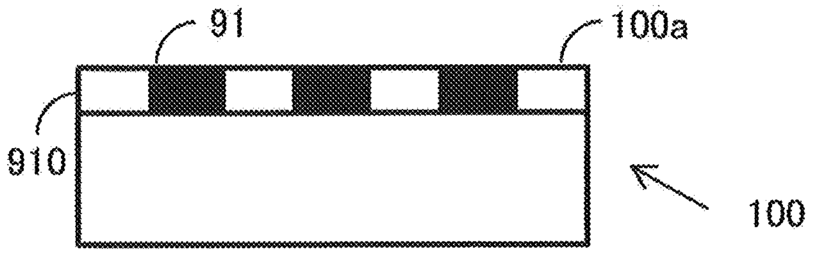
FIG. 7 is a schematic diagram illustrating an arrangement example of the pressure distribution sensor 910.

It may also be that, as shown in FIG. 7, the pressure distribution sensor 910 in which multiple pressure sensors 91 are provided is mounted in the cleaning plate 100*a* of the self-cleaning device 100. According to such configuration, with the lift device 70 as the pressing mechanism 90 pressing the roll cleaning member 81 against the cleaning plate 100*a*, the self-cleaning of the roll cleaning member 81 is performed, the measurement is performed by the pressure sensor 91, and the efficiency is facilitated.

Referring to FIG. 5 again, the determination part 92 performs a predetermined determination (to be described afterwards) in accordance with the measurement value from the pressure sensor 91. The determination part 92 may also be provided in the control device 50. In addition, at least a portion of the function of the determination part 92 may also be realized through a processor executing a predetermined program.

Figure 8:
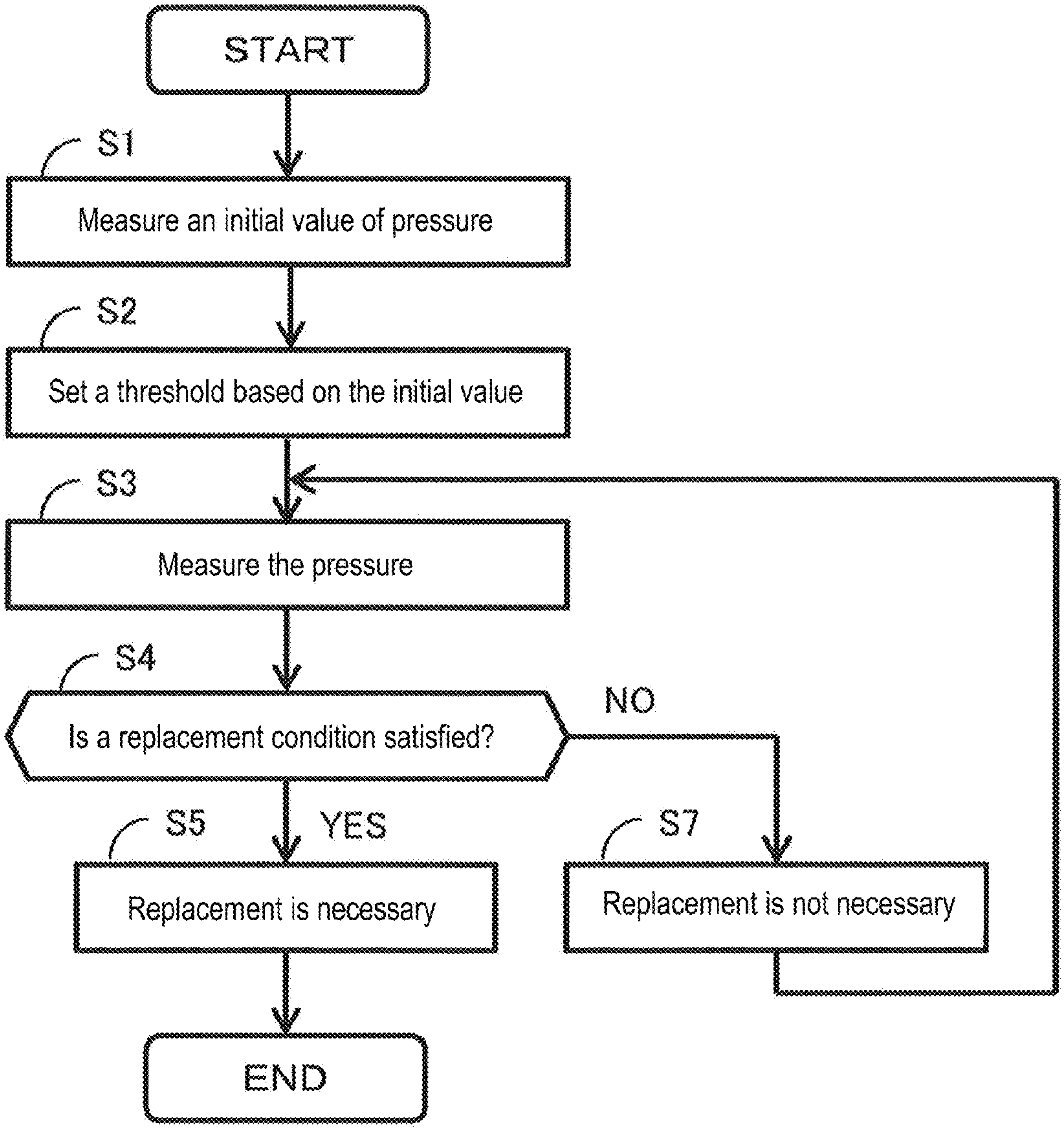
FIG. 8 is a flowchart illustrating a first example of a determination process performed by a determination part 92.

FIG. 8 is a flowchart illustrating a first example of a determination process performed by the determination part 92. The determination process determines whether it is necessary to replace the roll cleaning member 81 in accordance with the measurement value from the pressure sensor 91.

Firstly, for an unused roll cleaning member 81, the pressing mechanism 90 presses the roll cleaning member 81 against the pressure sensor 91 with a predetermined pressing force. In addition, the pressure value measured by the pressure sensor 91 is obtained by the determination part 92 (Step S1). The pressure is set as an initial value.

In addition, the determination part 92 sets a threshold based on the initial value (Step S2). As an example, the threshold may be a value obtained by subtracting a predetermined value from the initial value, and may also be a value obtained by multiplying the initial value by a coefficient smaller than 1. Regardless of which of the above is used, the threshold is smaller than the initial value.

In addition, for the roll cleaning member 81 after the use starts, the pressing mechanism 90 presses, with the predetermined pressing force, the roll cleaning member 81 against the pressure sensor 91. In addition, the pressure value measured by the pressure sensor 91 is obtained by the determination part 92 (Step S3).

In addition, in the case where the measured pressure value satisfies a predetermined replacement condition (YES in Step S4), the determination part 92 determines that it is necessary to replace the roll cleaning member 81. In accordance with needs, the determination part 92 may also send an alert. In such case, the replacement of the roll cleaning member 81 is performed, and a new roll cleaning member 81 is used to perform substrate cleaning.

The replacement condition is, for example, that the pressure value measured at Step S3 is lower than the threshold set in Step S2. This is because, in the case where the abrasion is severe, even if the pressing force exerted by the pressing mechanism 90 is constant, the measured pressure may decrease. In the case where there are multiple pressure sensors 91, the determination part 92 may also make a determination based on the distribution of multiple pressure values that are measured. As specific examples, the replacement condition may be that all of the multiple pressure values that are measured are lower than the threshold, only some of the pressure values are lower than the threshold, or at least some of the pressure values are lower than the threshold.

In addition, in the case where the measured pressure value does not satisfy a predetermined replacement condition (NO in Step S4), the determination part 92 determines that it is not necessary to replace the roll cleaning member 81. In such case, the replacement of the roll cleaning member 81 is not performed, and the same roll cleaning member 81 is further used to perform substrate cleaning. The pressure measurement (Step S3) and the determination on whether the replacement condition is satisfied (Step S4) are repetitively performed until the replacement is determined as necessary. The pressure measurement and the determination may be performed every predetermined period (e.g., one week), and may also be performed every time a predetermined number of substrates are cleaned.

With the determination process, the time for replacing the roll cleaning member 81 can be appropriately determined.

Then, a second example of the determination process performed by the determination part 92 is described. The determination process determines whether it is necessary to change a cleaning parameter at the time of cleaning the substrate by using the roll cleaning member 81 in accordance with the measurement value from the pressure sensor 91, and changes the cleaning parameter when necessary.

The cleaning parameter is a parameter that exerts an influence on a pressing force F of the roll cleaning member 81 with respect to the substrate W at the time of substrate cleaning. It can be said that the pressing force F is determined with the cleaning parameter as one factor. In the following, the cleaning parameter is set as a stroke amount L at the time when the roll cleaning member 81 is pressed against the substrate W during substrate cleaning. The control device 50 lifts or lowers the lift device body 70 in accordance with the stroke amount L. In addition, the pressing force F is generated in accordance with the stroke amount L.

Figure 9A:
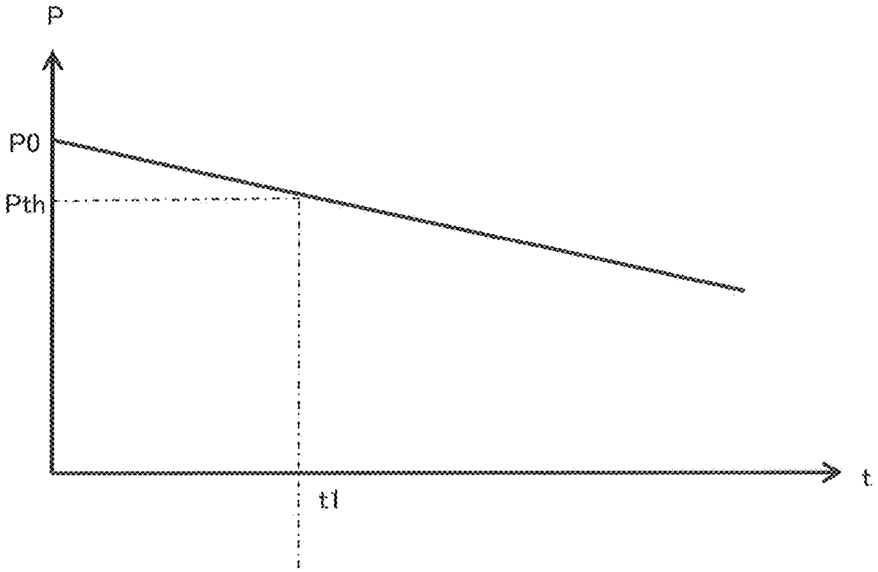
FIGS. 9A to 9C are diagram illustrating a second example of the determination process.
Figure 9B:
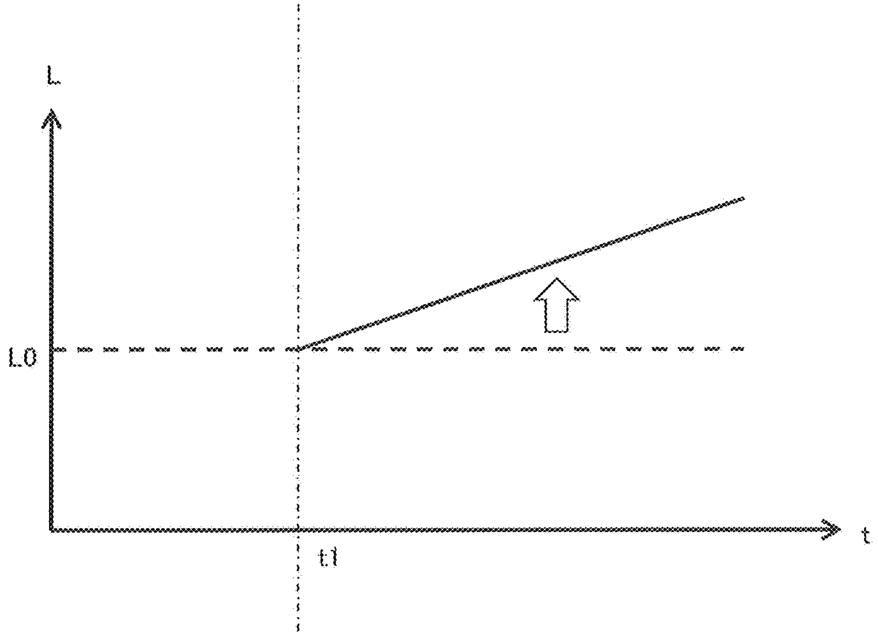
Figure 9C:
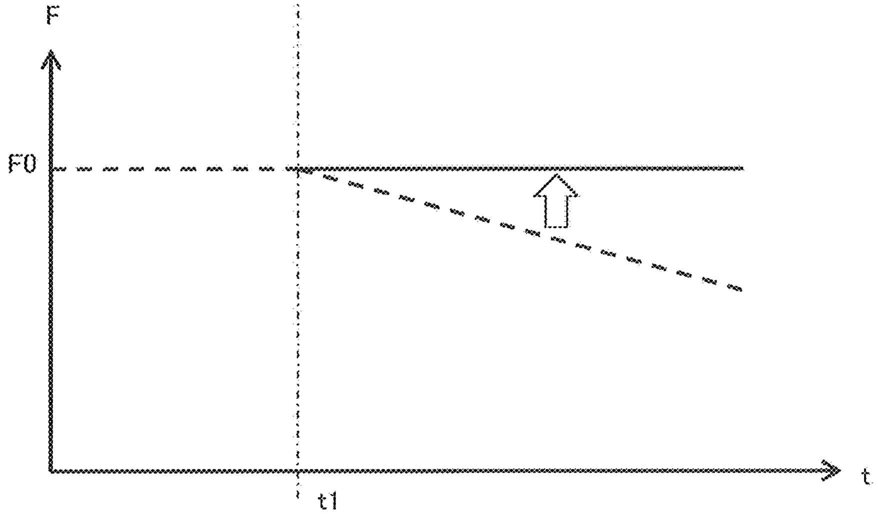

FIGS. 9A to 9C are diagrams illustrating the second example of the determination process. The horizontal axis illustrates the passing of time, and corresponds to the abrasion of the roll cleaning member 81.

The vertical axis of FIG. 9A schematically illustrates the pressure value P measured by the pressure sensor 91 in the case where the roll cleaning member 81 is pressed against the pressure sensor 91 by the pressing mechanism 90 with a predetermined pressing force at each time t. The measured pressure value P decreases through time. That is, the measured pressure value P decreases through the abrasion of the roll cleaning member 81.

The vertical axis of FIG. 9B schematically illustrates the stroke amount L at each time t. The broken line of the same figure is an example in which the stroke amount L is the same from the initial value L0, and the solid line illustrates that the stroke amount L changes through the determination process.

The vertical axis of FIG. 9C schematically illustrates the pressing force F of the roll cleaning member 81 with respect to the substrate W in each time t. The broken line of the same figure is the pressing force F in the case where the stroke amount L remains the same from the initial value L0, and the solid line is the pressing force F in the case where the stroke amount L is changed through the determination process.

A predetermined target value F0 (e.g., 1N) is set to be the pressing force F of the roll cleaning member 81 with respect to the substrate W. In the case where the abrasion of the roll cleaning member 81 is not severe ($t<t1$), the pressing force becomes the target value F0 when the stroke amount L is the initial value L0. However, when the abrasion of the roll cleaning member 81 progresses ($t1<t$), if the stroke amount L remains at the initial value L0, the pressing force F becomes weaker than the target value F0 (the broken lines of FIGS. 9B and 9C). Therefore, in the determination process, the stroke amount L changes by increasing in accordance with the abrasion of the roll cleaning member 81. Accordingly, even if the roll cleaning member 81 is abraded, the pressing force F can be maintained at the target value F0.

Figure 10:
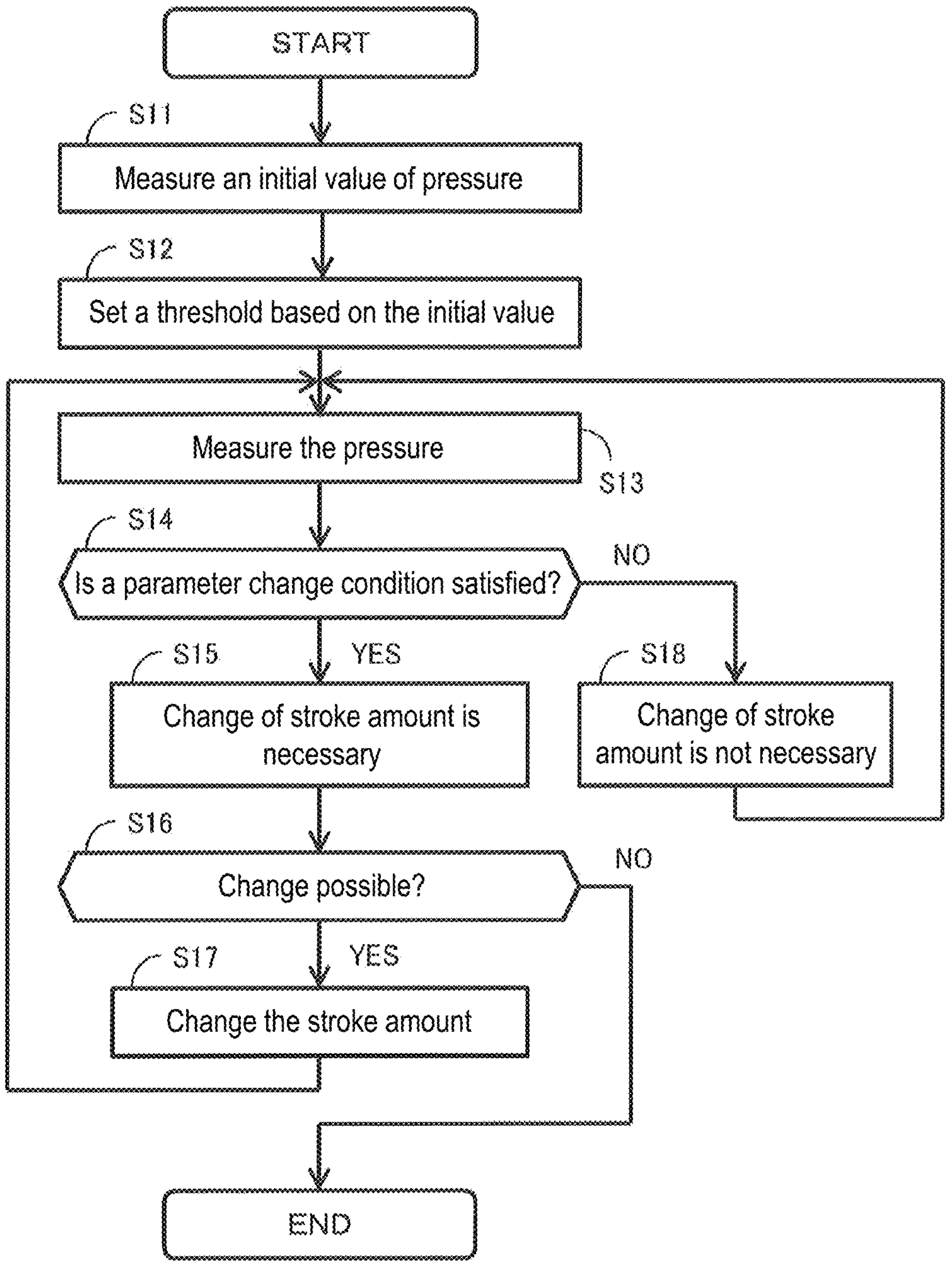
FIG. 10 is a flowchart illustrating the second example of the determination process performed by the determination part 92.

FIG. 10 is a flowchart illustrating a second example of the determination process performed by the determination part 92. Steps S11 to S13 are respectively the same as Steps S1 to S3 of FIG. 8, so the description is omitted.

In the case where the pressure value P measured in Step S13 satisfies a predetermined parameter change condition (YES in Step S14), the determination part 92 determines that it is necessary to change the stroke amount L (Step S15).

The parameter change condition is, for example, that the measured pressure value P is lower than a threshold Pth set in Step S12. This is because, in the case where the abrasion is severe, even if the pressing force exerted by the pressing mechanism 90 is constant, the measured pressure may decrease. In the case where there are multiple pressure sensors 91, the determination part 92 may also make a determination based on the distribution of multiple pressure values that are measured. As specific examples, the parameter change condition may be that all the multiple pressure values that are measured are lower than the threshold, only some of the pressure values are lower than the threshold, or at least some of the pressure values are lower than the threshold.

In the case where it is determined as necessary to change the stroke amount L, the determination part 92 determines whether it is possible to change the stroke amount L in accordance with the pressure value P (Step S16). This is because, in the case where the abrasion is severe, cleaning cannot be performed appropriately even if the stroke amount L is changed. The determination, for example, may also be performed based on whether the pressure value P is less than another threshold smaller than the threshold Pth set in Step S12.

In the case where it is determined as necessary to change the stroke amount L and it is possible to change (YES in Step S16), the determination part 92 changes the stroke amount L in accordance with the pressure value P0 (Step S17). The means of change is not particularly limited.

For example, it may be that the relationship between the measured pressure value P and the stroke amount L where the pressing force F becomes the target value F0 is set in advance, and the determination part 92 may change the stroke amount L based on the relationship. The relationship may be represented in the form of a table, and may also be represented in a mathematical formula, for example.

Alternatively, it may also be that the relationship between the measured pressure value P and the stroke amount L where the pressure value F becomes the target value F0 is learned in advance (e.g., machine learning), and the determination part 92 changes the stroke amount L based on the learning result.

In either case, the determination part 92 changes the stroke amount L so that, at the time of substrate cleaning, the pressing force of the roll cleaning member 81 with respect to the substrate W becomes the target value F0.

Such setting or learning in advance can be performed in advance by adjusting the stroke amount L so that the pressing force detected by the sensor 72 (load cell) of FIG. 3 for the roll cleaning member 81 when the measured pressure value is P becomes the target value F0.

Then, at the time of substrate cleaning, the control device 50 controls the lift device 70 to press the roll cleaning member 81 against the substrate W in accordance with the stroke amount L after change. By appropriately changing the stroke amount L in accordance with the abrasion of the roll cleaning member 81, even if the roll cleaning member 81 is abraded, the pressing force F can be maintained at the target value F0.

Meanwhile, in the case where the measured pressure value P does not satisfy the parameter change condition (NO in Step S14), the determination part 92 determines that it is not necessary to change the load amount L (Step S18). In such case, the control device 50 controls the lift device 70 to press the roll cleaning member 81 against the substrate W in accordance with the stroke amount L that is not changed. The pressure measurement (Step S13) and the determination (Step S14) are repetitively performed until it is determined as necessary to make a change. The pressure measurement and the determination may be performed every predetermined period (e.g., one week), and may also be performed every time a predetermined number of substrates are cleaned.

With the determination process, the cleaning parameter as the stroke amount L can be adjusted appropriately, and, even if the roll cleaning member 81 is abraded, substrate cleaning can still be performed with a constant pressing force.

Then, a third example of the determination process performed by the determination part 92 is described. The determination process determines whether it is necessary to change the cleaning parameter and whether it is necessary to replace the roll cleaning parameter 81 in accordance with the measurement value from the pressure sensor 91.

Figure 11A:
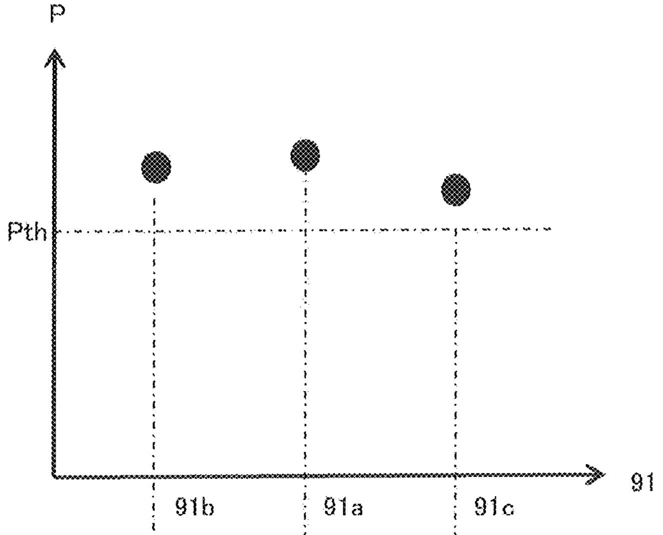
FIGS. 11A to 11C are diagrams illustrating a third example of the determination process.
Figure 11B:
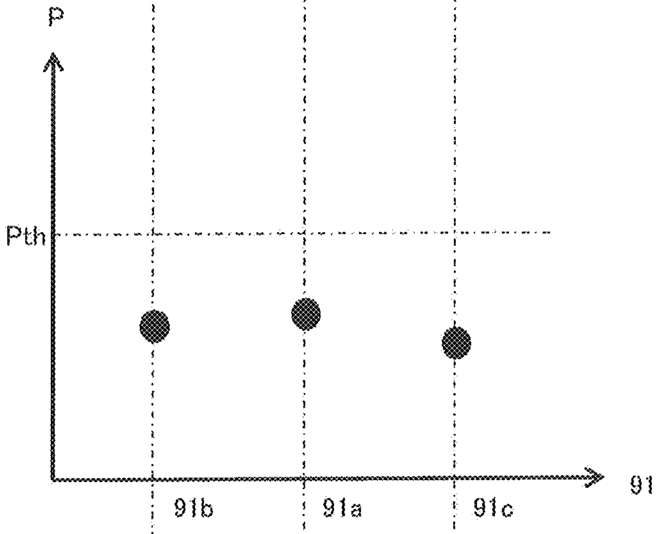
Figure 11C:
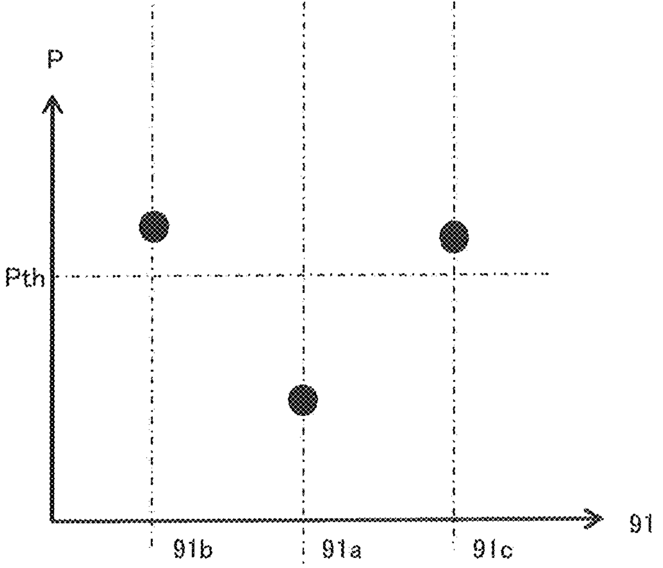

FIGS. 11A to 11C are diagrams illustrating the third example of the determination process. The determination process intends to use multiple pressure sensors 91 (set in the following as pressure sensors 91*a* to 91*c* shown in FIG. 6A or 6B). Then, the horizontal axes of FIGS. 11A to 11C are pressure sensors 91*a* to 91*c*, and the vertical axes are respective pressure values P measured by the pressure sensors 91*a* to 91*c*.

In the case where the abrasion of the roll cleaning member 81 is not severe, as shown in FIG. 11A, when the pressing mechanism 90 presses the roll cleaning member 81 against the pressure sensors 91*a* to 91*c* with the predetermined pressing force, the measured pressure values P are all about the initial value and higher than the threshold Pth. In the case of such pressure distribution, it is not necessary to replace the roll cleaning member 81, and it is not necessary to change the cleaning parameter, either.

In the case where the roll cleaning member 81 is generally abraded (e.g., the central portion corresponding to the pressure sensor 91*a* and the portions differing from the center and corresponding to the pressure sensors 91*b*, 91*c* are substantially and uniformly abraded), as shown in FIG. 11B, when the pressing mechanism 90 presses the roll cleaning member 81 against the pressure sensors 91*a* to 91*c* with the predetermined pressing force, the measured pressure values P are all lower than the threshold Pth. In the case of such pressure distribution, it suffices as long as the cleaning parameter is changed to adjust the pressing force at the time of cleaning, and it is not necessary to replace the roll cleaning member 81.

In the case where the roll cleaning member 81 is partially abraded (e.g., while the central portion correspondingly to the pressure sensor 91*a* is severely abraded, the portions differing from the center and corresponding to the pressure sensors 91*b*, 91*c* are not quite abraded), as shown in FIG. 11C, when the pressing mechanism 90 presses the roll cleaning member 81 against the pressure sensors 91*a* to 91*c* with the predetermined pressing force, only some of the measured pressure values P are lower than the threshold Pth. In the case of such pressure distribution, it is difficult to change the cleaning parameter that adjusts only a portion of the pressing force at the time of cleaning. Accordingly, in such case, it is determined as necessary to replace the roll cleaning member 81.

Figure 12:
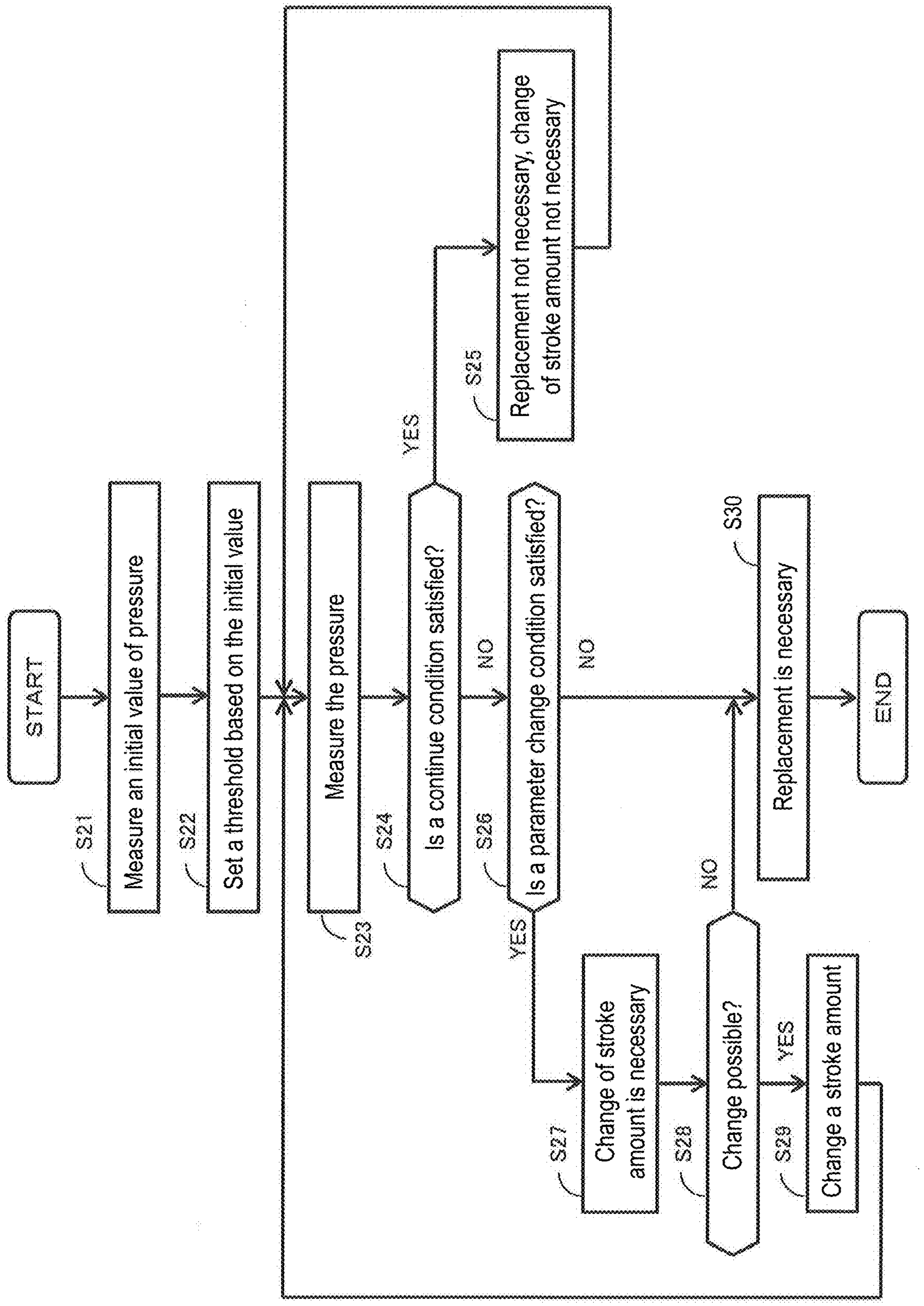
FIG. 12 is a flowchart illustrating the third example of the determination process performed by the determination part 92.

FIG. 12 is a flowchart illustrating the third example of the determination process performed by the determination part 92. Steps S21 to S23 are respectively the same as Steps S1 to S3 of FIG. 8, so the description is omitted.

In the case where the pressure value P measured in Step S23 satisfies a predetermined continue condition (YES in Step S24), the determination part 92 determines that it is not necessary to replace the roll cleaning member 81 and that it is not necessary to change the stroke amount L, either (Step S25). As shown in FIG. 11A, the continue condition is that all the measured pressure values P are higher than the threshold Pth. In such case, the replacement of the roll cleaning member 81 is not performed, and the same roll cleaning member 81 is further used to perform substrate cleaning. In addition, substrate cleaning is performed in accordance with the stroke amount L without change.

Meanwhile, in the case where the measured pressure value P does not satisfy the continue condition (NO in Step S24) and satisfies the predetermined parameter change condition (YES in Step S26), the determination part 92 determines that while it is not necessary to replace the roll cleaning member 81, it is necessary to change the stroke amount L (Step S27). The parameter change condition is that the measured pressure values P are all lower than the threshold Pth, as shown in FIG. 11B.

In the case where it is determined as necessary to change the stroke amount L, the determination part 92 determines whether it is possible to change the stroke amount L in accordance with the pressure value P (Step S28). In the case where it is determined as necessary to change the stroke amount L and possible to change (YES in Step S28), the determination part 92 changes the stroke amount L in accordance with the pressure value P0 (Step S29). Then, substrate cleaning is performed in accordance with the stroke amount L after change. The means of change is not particularly limited. Steps S28, S29 may be the same as Steps S16, S17 of FIG. 10.

In the case where the parameter change condition is satisfied (YES in Step S26) but a change cannot be made (NO in Step S28), the determination part 92 determines that it is necessary to replace the roll cleaning member 81 (Step S30). This is because the abrasion is severe and cleaning cannot be performed appropriately even if the stroke amount L is changed. In such case, the replacement of the roll cleaning member 81 is performed, and a new roll cleaning member 81 is used to perform substrate cleaning.

In addition, in the case where the continue condition is not satisfied (NO in Step S242) and the parameter change condition is not satisfied, either, the determination part 92 determines that it is necessary to replace the roll cleaning member 81 (Step S30). In such case as well, the replacement of the roll cleaning member 81 is performed, and a new roll cleaning member 81 is used to perform substrate cleaning. The case in which the continue condition is not satisfied and the parameter change condition is not satisfied, either, is that only some of the measured pressure values are lower than the threshold Pth.

In brief, in the case where the condition that the distribution of the pressure values P measured by the pressure sensors 91 is satisfied, the determination part 92 determines that it is not necessary to replace the roll cleaning member 81 and it is not necessary to change the stroke amount L, either. Such condition is that, for example, the pressure values P measured by the pressure sensors 91 all exceed the threshold Pth, for example.

In the case where the condition that the distribution of the pressure values P measured by the pressure sensors 91 is satisfied, the determination part 92 determines that it is not necessary to replace the roll cleaning member 81, but it is necessary to change the stroke amount L. Such condition is that, for example, the pressure values P measured by the pressure sensors 91 are all lower than the threshold Pth, for example.

In the case where the condition that the distribution of the pressure values P measured by the pressure sensors 91 is satisfied, the determination part 92 determines that it is necessary to replace the roll cleaning member 81. Such condition is that, for example, only some of the pressure values measured by the pressure sensors 91 are lower than the threshold Pth, for example.

With the determination process, in the case where the roll cleaning member 81 is abraded, whether the roll cleaning member 81 should be replaced and whether it suffices to adjust the cleaning parameter, which is the stroke amount L, without replacement can be appropriately determined.

Figure 13A:
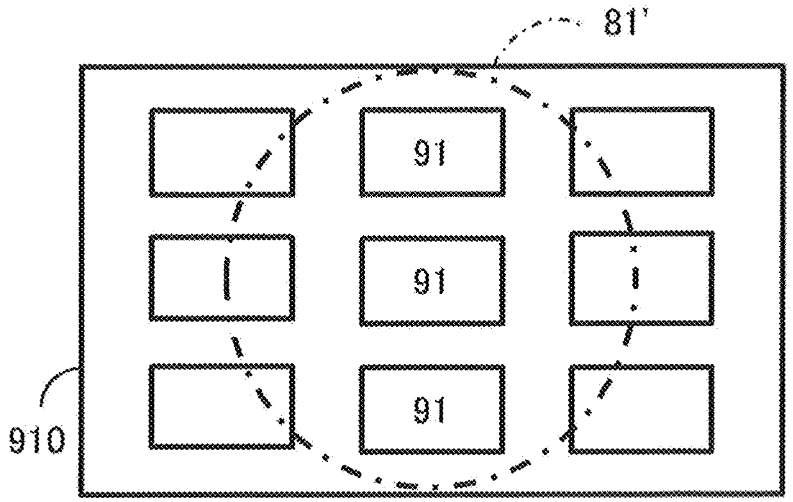
FIG. 13A is a schematic diagram illustrating an arrangement example of a pen-type cleaning member 81' when the pressure distribution sensor 910 is used.
Figure 13B:
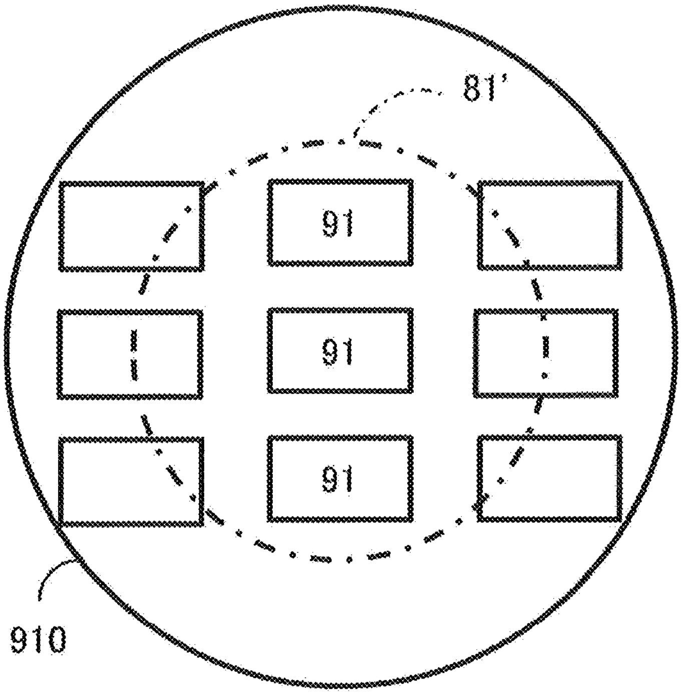
FIG. 13B is a schematic diagram illustrating another arrangement example of the pen-type cleaning member 81' when the pressure distribution sensor 910 is used.

Although the embodiment illustrates the roll cleaning member 81 in a cylindrically columnar shape extending in the horizontal direction as the substrate cleaning tool, the substrate cleaning tool may also be a pen-type cleaning member in a cylindrically columnar shape extending in the vertical direction. An arrangement example of a pen-type cleaning member 81' in the case where the pressure distribution sensor 910 is used is shown in FIGS. 13A and 13B.

In addition, a strain sensor 91' may also be used in place of the pressure sensor 91. Even if the pressing force exerted by the pressing mechanism 90 is constant, the greater the abrasion amount of the roll cleaning member 81, the smaller the output strain. Therefore, the pressure sensor 91 can be replaced with the strain sensor 91'.

Figure 14A:
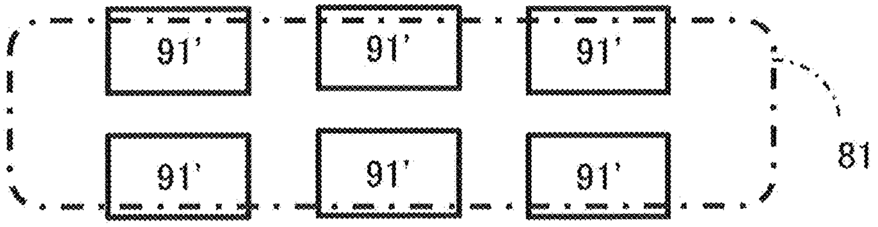
FIG. 14A is a schematic diagram illustrating an arrangement example when a strain sensor 91' is used and a substrate cleaning tool is the roll cleaning member 81.
Figure 14B:
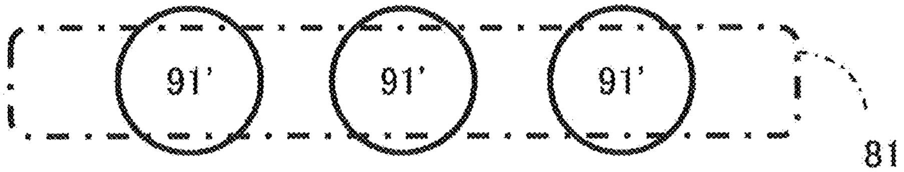
FIG. 14B is a schematic diagram illustrating another arrangement example when the strain sensor 91' is used and the substrate cleaning tool is the roll cleaning member 81.
Figure 15A:
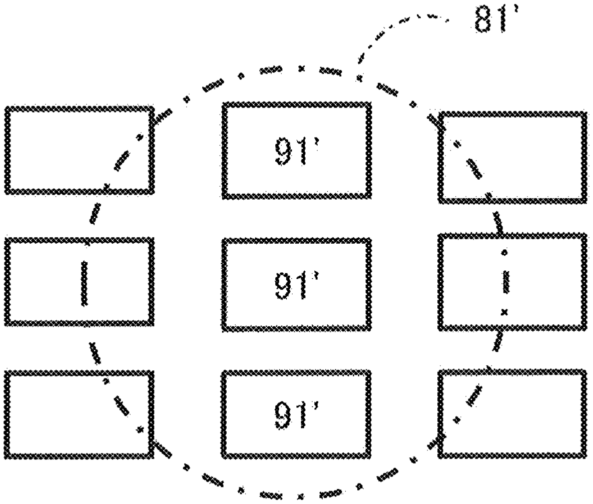
FIG. 15A is a schematic diagram illustrating an arrangement example when the strain sensor 91' is used and the substrate cleaning tool is the pen-type cleaning member 81'.
Figure 15B:
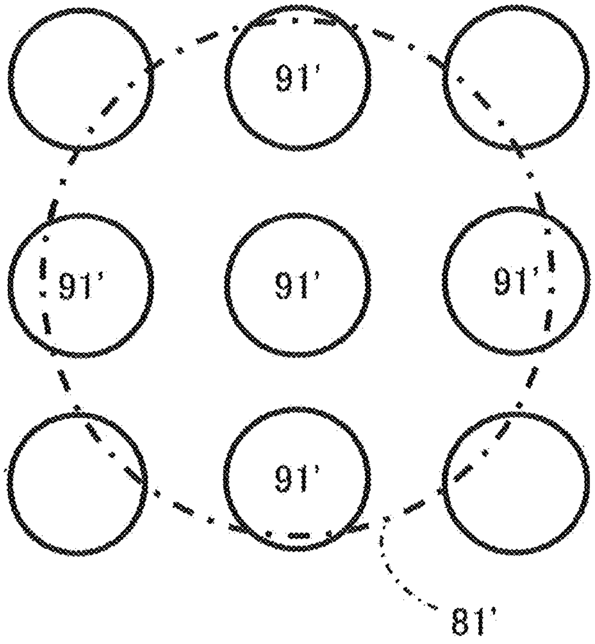
FIG. 15B is a schematic diagram illustrating another arrangement example when the strain sensor 91' is used and the substrate cleaning tool is the pen-type cleaning member 81'.

FIGS. 14A and 14B illustrate an arrangement example when the strain sensor 91' is used and the substrate cleaning tool is the roll cleaning member 81. In addition, FIGS. 15A and 15B illustrate an arrangement example when the strain sensor 91' is used and the substrate cleaning tool is the pen-type cleaning member 81'.

In either arrangement, for the sensors 91, 91', it may be the sensor 91, 91' pressed at the substantial center of the cleaning surface of the substrate cleaning tool and the two pressure sensors 91, 91 respectively pressed at at least two positions different from the center are provided.

Sensors other than the pressure sensor 91 and the strain sensor 91' may be used to output measurement values corresponding to the abrasion of the substrate cleaning tool.

Any or all of the functional units described in the specification may be realized by a program. The program mentioned in the specification may be distributed by being non-temporarily recorded in a computer-readable recording medium, or may be distributed via a communication line (including wireless communication) such as the Internet, or may be distributed in an installed state to an arbitrary terminal.

Based on the above description, those skilled in the art may conceive of additional effects and various modified examples of the invention, and the modes of the invention are not limited to the individual embodiments described above. Various additions, modifications, and partial deletions are possible without departing from the concept and spirit of the invention as derived from the contents defined in the claims and their equivalents.

For example, what is described in the specification as a single device (or component, the same applies below) (including what is depicted in the drawings as a single device) may be realized by multiple devices. On the contrary, what is described in the specification as multiple devices (including what is depicted in the drawings as multiple devices) may be realized by a single device. Alternatively, some or all of the means or functions included in one device may be included in another device.

Furthermore, not all of the matters described in this specification are essential requirements. In particular, anything described in the specification but not claimed may be considered an arbitrary additional matter.

The applicant is only aware of the inventions disclosed in the documents in the "Prior Art Documents" section of the specification, and the invention does not necessarily aim to solve the issues in the inventions disclosed in the documents. The issue to be solved by the invention should be identified in consideration of the entire specification. For example, if it is stated in the specification that a specific effect is achieved by a particular configuration, it can also be said that an issue that is the opposite of the specific effect is solved. However, it is not intended that such a specific configuration is necessarily a required requirement.

What is claimed is:

1. An abrasion detection device, comprising:

a plurality of sensors, outputting measurement values in accordance with an abrasion of a substrate cleaning tool;

a pressing mechanism, pressing the substrate cleaning tool against the sensors; and a determination part, performing a determination on whether it is necessary to replace the substrate cleaning tool and performing a determination on whether it is necessary to change a cleaning parameter at a time of performing substrate cleaning by using the substrate cleaning tool in accordance with the measurement values from the sensors.

2. The abrasion detection device as claimed in claim 1, wherein the determination part performs a determination that it is not necessary to replace the substrate cleaning tool and no change is to be made to the cleaning parameter in a case where the measurement values from the sensors satisfy a first condition, performs a determination that it is not necessary to replace the substrate cleaning tool but it is necessary to change the cleaning parameter in a case where the measurement values from the sensors satisfy a second condition, and performs a determination that it is necessary to replace the substrate cleaning tool in a case where the measurement values from the sensors satisfy a third condition.

3. The abrasion detection device as claimed in claim 2, wherein the first condition is that the measurement values from the sensors all exceed a threshold, the second condition is that the measurement values from the sensors are all lower than the threshold, and the third condition is that only some of the measurement values from the sensors are lower than the threshold.

4. The abrasion detection device as claimed in claim 1, wherein the determination part changes the cleaning parameter in accordance with the measurement values in a case where it is determined as necessary to change the cleaning parameter.

5. The abrasion detection device as claimed in claim 4, wherein the determination part learns in advance a relationship between the measurement values and an appropriate value of the cleaning parameter and changes the cleaning parameter based on a learning result.

6. The abrasion detection device as claimed in claim 4, wherein substrate cleaning comprises pressing the substrate cleaning tool against a substrate by a predetermined stroke amount, the cleaning parameter is the stroke amount, and the determination part changes the stroke amount so that a pressing force of the substrate cleaning tool with respect to the substrate becomes a target value.

7. The abrasion detection device as claimed in claim 1, wherein the substrate cleaning tool has a cleaning surface coming into contact with a substrate at a time of substrate cleaning, and the sensors comprise:

a first sensor, pressed at a first position different from a center of the cleaning surface;

a second sensor, pressed at a second position different from the center of the cleaning surface and the first position, and a third sensor, pressed at a substantial center of the cleaning surface.

8. The abrasion detection device as claimed in claim 1, wherein substrate cleaning comprises pressing the substrate cleaning tool against a substrate by a predetermined stroke amount, and the cleaning parameter is the stroke amount.

9. The abrasion detection device as claimed in claim 1, wherein the sensor is a pressure sensor or a strain sensor.

10. A substrate cleaning device, comprising:

a substrate cleaning tool; and a self-cleaning device, performing self-cleaning of the substrate cleaning tool; and the abrasion detection device as claimed in claim 1, wherein the sensor of the abrasion detection device is provided at the self-cleaning device or in a vicinity of the self-cleaning device.

11. The substrate cleaning device as claimed in claim 10, wherein the sensor is a pressure sensor, the self-cleaning device has a cleaning plate on which a pressure distribution sensor is mounted, the pressure distribution sensor being provided with a plurality of the pressure sensors, and with the pressing mechanism of the abrasion detection device pressing the substrate cleaning tool against the cleaning plate, the substrate cleaning tool is self-cleaned and measurements are carried out by the pressure sensors.

12. A substrate cleaning device, comprising:

a substrate cleaning tool; and the abrasion detection device as claimed in claim 1, wherein the pressing mechanism of the abrasion detection device presses the substrate cleaning tool against a substrate for substrate cleaning, and presses the substrate cleaning tool against the sensor for the determination by the determination part.

13. A substrate cleaning device, comprising:

a substrate cleaning tool;

the abrasion detection device as claimed in claim 4; and a control part, exerting control to press the substrate cleaning tool against a substrate in accordance with a cleaning parameter changed by the determination part of the abrasion detection device at a time of substrate cleaning.

14. A substrate processing device, comprising:

a substrate polishing device, polishing a substrate; and the substrate cleaning device as claimed in claim 10, cleaning the substrate after the substrate is polished.

15. An abrasion detection method, comprising:

a first process of pressing a substrate cleaning tool against a plurality of sensors that output measurement values in accordance with abrasion of the substrate cleaning tool; and a second process of performing a determination on whether it is necessary to replace the substrate cleaning tool and a determination on whether it is necessary to change a cleaning parameter at a time of performing substrate cleaning by using the substrate cleaning tool in accordance with the measurement values from the sensors.

16. The abrasion detection method as claimed in claim 15, further comprising a third process of changing the cleaning parameter in accordance with the measurement values in a case where it is determined as necessary to change the cleaning parameter.

17. A substrate cleaning method, comprising:

a process of executing the abrasion detection method as claimed in claim 15;

a process of performing substrate cleaning without replacing the substrate cleaning tool in a case where it is determined as not necessary to replace the substrate cleaning tool in the second process; and a process of replacing the substrate cleaning tool and performing substrate cleaning by using a new substrate cleaning tool in a case where it is determined as necessary to replace the substrate cleaning tool.

18. A substrate cleaning method, comprising:

a process of executing the abrasion detection method as claimed in claim 16; and a process of pressing the substrate cleaning tool against a substrate to perform substrate cleaning in accordance with a cleaning parameter changed in accordance with the third process.

19. A substrate cleaning method, comprising:

a first process of learning a relationship between a measurement value at a time when a substrate cleaning tool is pressed against one or more sensors outputting the measurement value in accordance with abrasion of a substrate cleaning tool and an appropriate value of a cleaning parameter at a time of performing substrate cleaning by using the substrate cleaning tool; and a second process of pressing the substrate cleaning tool against the one or more sensors;

a third process of changing the cleaning parameter in accordance with the measurement value from the sensor in the second process based on a learning result in the first process; and a fourth process of performing substrate cleaning based on the cleaning parameter that is changed.

* * * * *